United States Patent [19]

Rajewski

[11] Patent Number: 5,542,617

[45] Date of Patent: Aug. 6, 1996

[54] MOBILE PAPER SHREDDER

[76] Inventor: David E. Rajewski, Box 22, Gadsby, Alberta, Canada, T0C 1B0

[21] Appl. No.: 295,034

[22] Filed: Aug. 25, 1994

[51] Int. Cl.⁶ .............................. B02C 9/04; B02C 13/00
[52] U.S. Cl. ................... 241/101.761; 241/101.763; 241/186.4; 241/189.1; 241/243; 241/DIG. 38
[58] Field of Search .................. 241/101.74, 101.75, 241/101.761, 101.763, 186.2, 186.4, 189.1, 242, 243, DIG. 38

[56] References Cited

U.S. PATENT DOCUMENTS 4,485,976  12/1984  White ................................ 241/186.2
5,205,496  4/1993  O'Donnell et al. ............ 241/186.2 X
5,402,948  4/1995  Kaczmarek ..................... 241/186.2 X

*Primary Examiner*—Timothy V. Eley
*Attorney, Agent, or Firm*—Anthony R. Lambert

[57] ABSTRACT

A truck mounted mobile paper shredder with high shredding rate incorporates a hammer mill, with a sweeping arm in a tub feeding the mill. A lifting arm lifts paper containers to an inverted position over the tub to feed paper into the tub. The hammer mill, with striking angle less than 30° feeds paper into a compactor with reciprocating plunger. Compacted shredded paper passes through a movable wall into a storage area having an unloading gate. Movement of the movable wall forces compacted shredded paper out of the unloading gate.

23 Claims, 14 Drawing Sheets

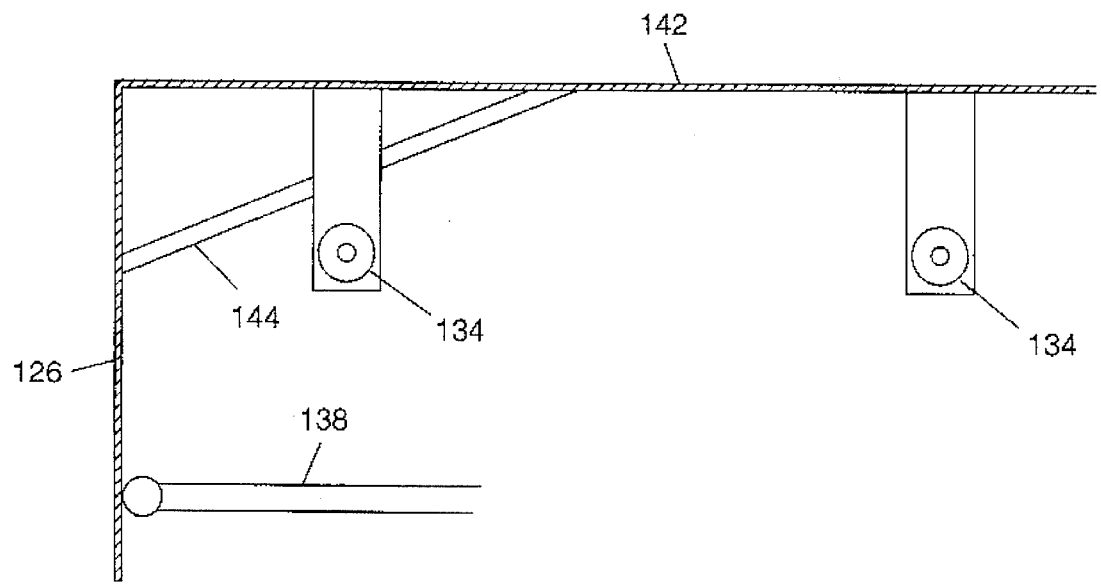
FIG. 6B
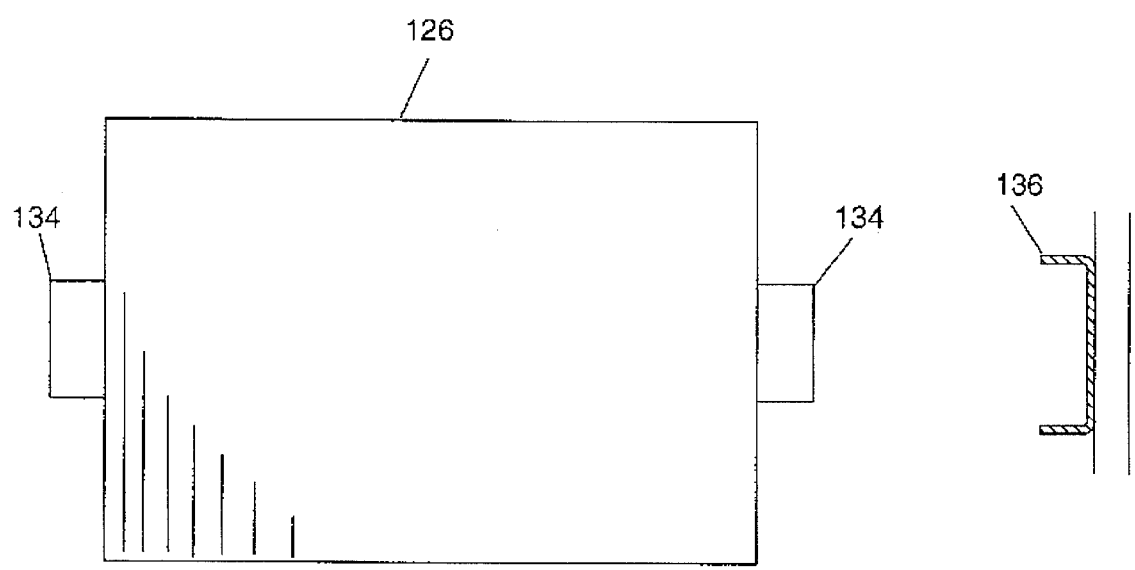
FIG. 6C
FIG. 6D

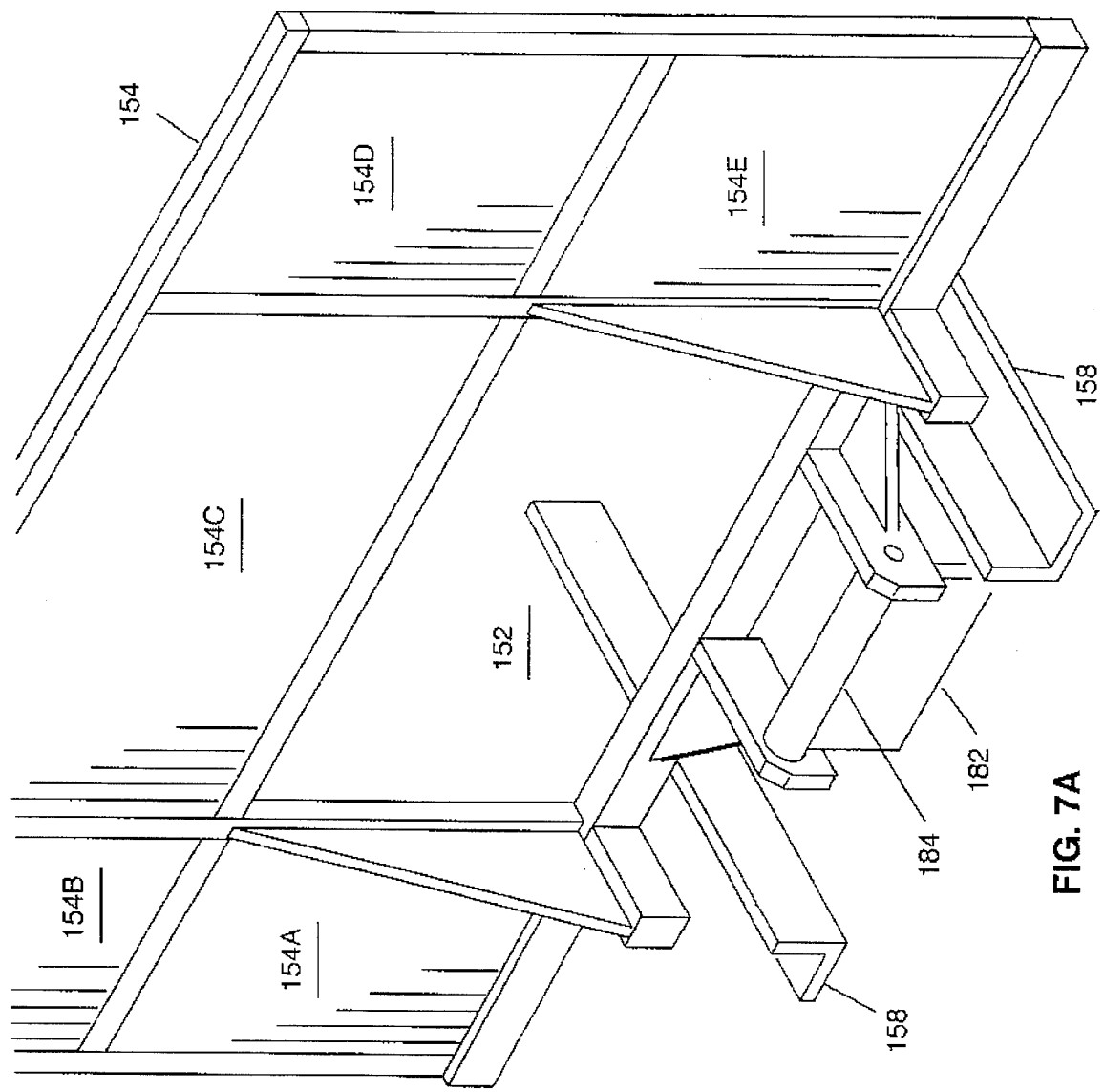
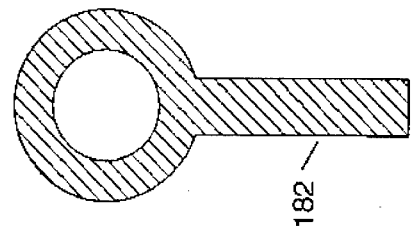

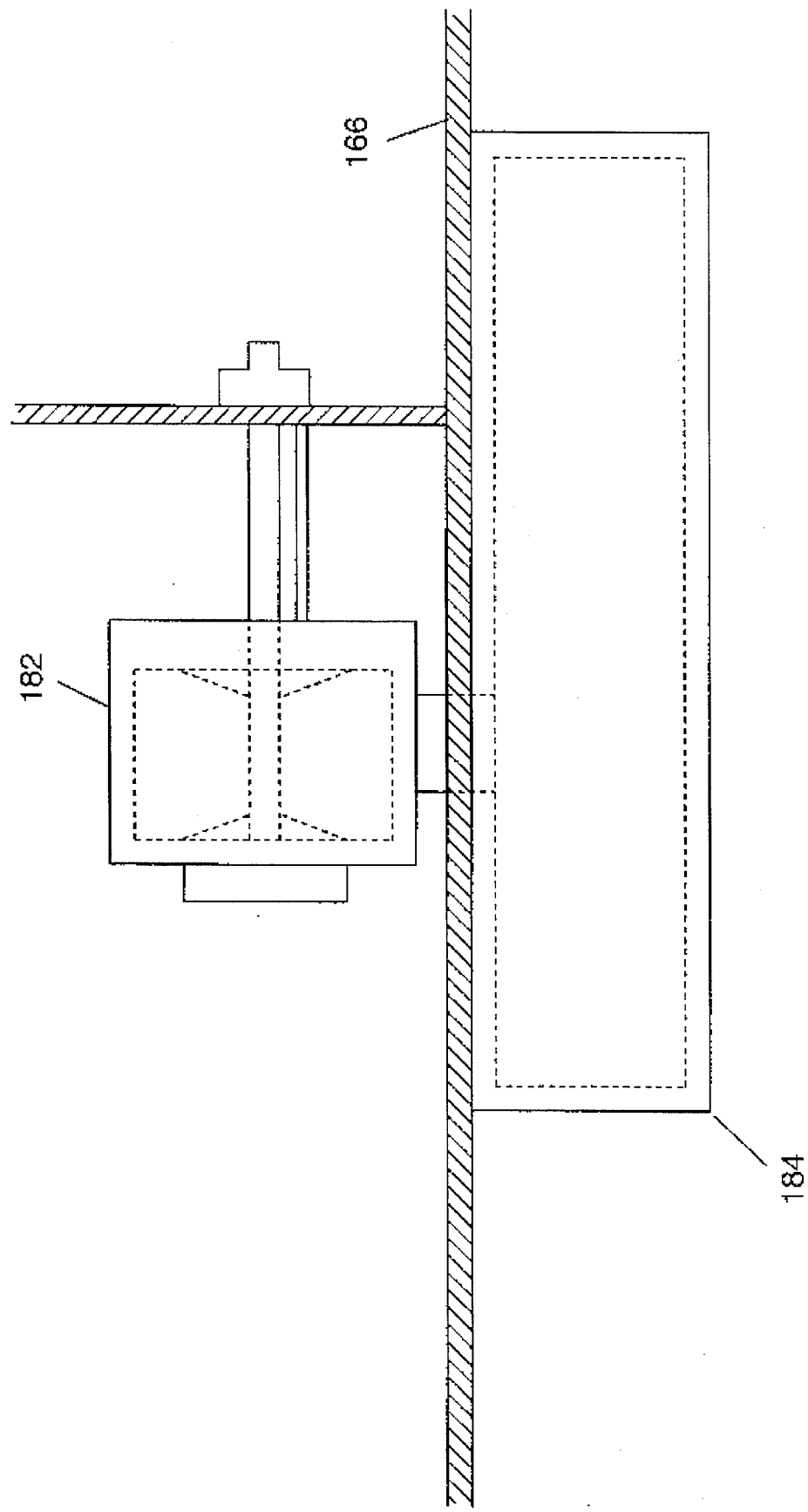

MOBILE PAPER SHREDDER

FIELD OF THE INVENTION

This invention relates to methods and apparatus used in the shredding of paper, and particularly to mobile paper shredders.

BACKGROUND AND SUMMARY OF THE INVENTION

In the prior art of which the inventor is aware, mobile and other paper shredders typically use knuckle type devices to shred paper. So far as the inventor is aware, mobile paper shredders, other than those made by the inventor, achieve shredding rates of less than 2000 lbs per hour. The slow rate is believed to be due to the use of slowly rotating pairs of shafts.

In a mobile paper shredder used commercially in secret by the inventor and his company in the United States more than one year before the filing of this application, the inventor used a mobile paper shredder using a hammer mill for the shredding of the paper. The hammer mill included rotating hammers mounted on a horizontal axis, with the horizontal axis below a lower confining surface of a tub. The hammers rotated up into the tub and down in an opening in the tub, past impact surfaces located on a side of the opening. Paper caught between the hammers and the impact surfaces was shredded. Paper was fed to the opening along the lower confining surface of the tub. At impact, the striking angle was greater than 30°. The striking angle in a hammer mill is the angle between the direction of movement of the hammer at the point of impact with paper being shredded and the direction it is desired to send the shredded paper, that is towards a discharge bin or chute. Since the direction of feed of shredded paper is normally at right angles to the direction of ejection of shredded paper, this is typically equivalent to the angle between the long axis of the hammers and the direction of feed.

This design, with a striking angle greater than 30°, proved moderately successful, but was subject to jamming as the hammers moved past the impact surfaces. This is believed to be due to the hammers imparting a component of movement to the paper in the direction of the impact surfaces, and therefore leading to bunching of paper between the impact surfaces and the hammers, thus jamming the hammers. For a striking angle greater than 30°, the force imparting a component of movement in the direction towards the impact surfaces is greater than one-half the force tending to shear the paper.

The inventor proposes a novel construction of a paper shredder believed to be able to achieve a shredding rate of up to 8,000 lbs per hour. In one aspect of the invention, a paper shredding apparatus including a paper feeder, paper shredder with hammers and shredded paper unloader has its hammers mounted at a striking angle of less than 30°. It is desirable that the striking angle be as low as possible (near zero). However, the limitation that the axle on which the hammers are mounted be lower than the lower confining surface of the tub limits the angle to about 10° to 20° in many practical situations.

Further improvements have also been made to the design of the previously used paper shredder to increase the throughput of the paper shredder.

Thus, in one aspect of the invention, the feeder has a lower confining surface forming a predominantly horizontal plane, the horizontal axis on which the plural hammers are mounted lies below the horizontal plane; and the direction of feed is along the lower confining surface of the feeder towards the opening in the shredder.

The unloader preferably includes a bin formed of a base, first and second sidewalls spaced from each other and separated by the base, a reciprocating end wall disposed between the first and second sidewalls, and an upwardly extending discharge chute opposed to the reciprocating end wall; and a motor operatively connected to the reciprocating end wall such that reciprocation of the end wall compacts shredded paper within the bin and forces it out of the discharge chute.

The unloader may further include a shredded paper storage area bounded by walls, one of the walls being openable and forming an unloading gate, and one of the walls being movable across the storage area towards the openable wall, the discharge chute disposed to discharge paper into the storage area through one of the walls.

The paper feeder preferably includes a tub formed of an encircling wall, and a lower and upper confining surface, the inlet of the feeder being formed in the upper confining surface and the outlet being formed in the lower confining surface, the paper feeder including a sweeping arm mounted for rotation in the tub and to sweep across the lower confining surface between the encircling wall.

The paper shredder preferably includes a lifting arm mechanism for lifting and rotating initially upright paper containers to empty the paper containers into the paper feeder, the lifting arm mechanism including a lifting arm mounted about a horizontal axis and rotatable from a lower position for attaching a paper container onto the lifting arm to an upper discharge position, the lifting arm having a free end, a detachable latch for a paper container on the free end of the lifting arm, and means to rotate the paper container into an emptying position.

There is also preferably included according to a further aspect of the invention a governor connected to the paper feeder to regulate feeding of the rate at which paper is fed into the paper shredder.

According to an aspect of a method according to the invention, the following steps are included: feeding paper into a paper shredder mounted on a motor vehicle; shredding the paper to produce shredded paper; compacting the shredded paper to produce compacted shredded paper; and periodically moving the compacted shredded paper towards and out of the unloading gate.

According to a further aspect of the method, feeding the paper includes feeding the paper into the paper shredder along a direction of feed; and shredding the paper includes impacting the paper with hammers whose striking angle is less than 30°.

According to a still further aspect of the method of the invention, the paper shredder is located in a lower confining surface of a tub and feeding the paper into the paper shredder includes loading paper into the tub by lifting the paper in a paper container on a lifting arm to a point above the tub, and rotating the paper container to discharge the paper into the tub.

Feeding the paper into the paper shredder preferably includes moving paper in the direction of feed with a rotating arm mounted on a central vertical axis in the tub. Compacting the shredded paper preferably includes, according to a still further aspect of the invention, depositing shredded paper in a bin formed of a base, first and second sidewalls spaced from each other and separated by the base, a reciprocating end wall disposed between the first and second sidewalls, and a discharge chute opposed to the reciprocating end wall; and reciprocating the end wall towards and away from the discharge chute.

Periodically moving the compacted shredded paper includes according to a still further aspect of the invention depositing compacted shredded paper on one side of a moving wall; and periodically moving the moving wall towards the unloading gate. Preferably, the shredder is a hammer mill and the rate of feed of paper into the hammer mill is regulated.

BRIEF DESCRIPTION OF THE DRAWINGS

There will now be described preferred embodiments of the invention, with reference to the drawings, by way of illustration, in which like numerals denote like elements and in which:

FIG. 6B is a side view of a plunger for use with the compactor of FIG. 6A;

FIG. 6C is an end view of a plunger for use with the compactor of FIG. 6A;

FIG. 6D is a side section of a track for carriage of the plunger of FIG. 6B in the compactor of FIG. 6A;

FIG. 7A is a perspective of a moving wall for use in an unloader forming part of the paper shredder shown in FIG. 1;

FIG. 7B is a side section of a catch shown in FIG. 7A used to link the moving wall to a drive bar;

FIG. 9 shows a vacuum system for use with the mobile paper shredder of FIG. 1 used to keep paper debris to a minimum within the mobile paper shredder.

DETAILED DESCRIPTION OF PREFERRED EMBODIMENTS

Figure 1:
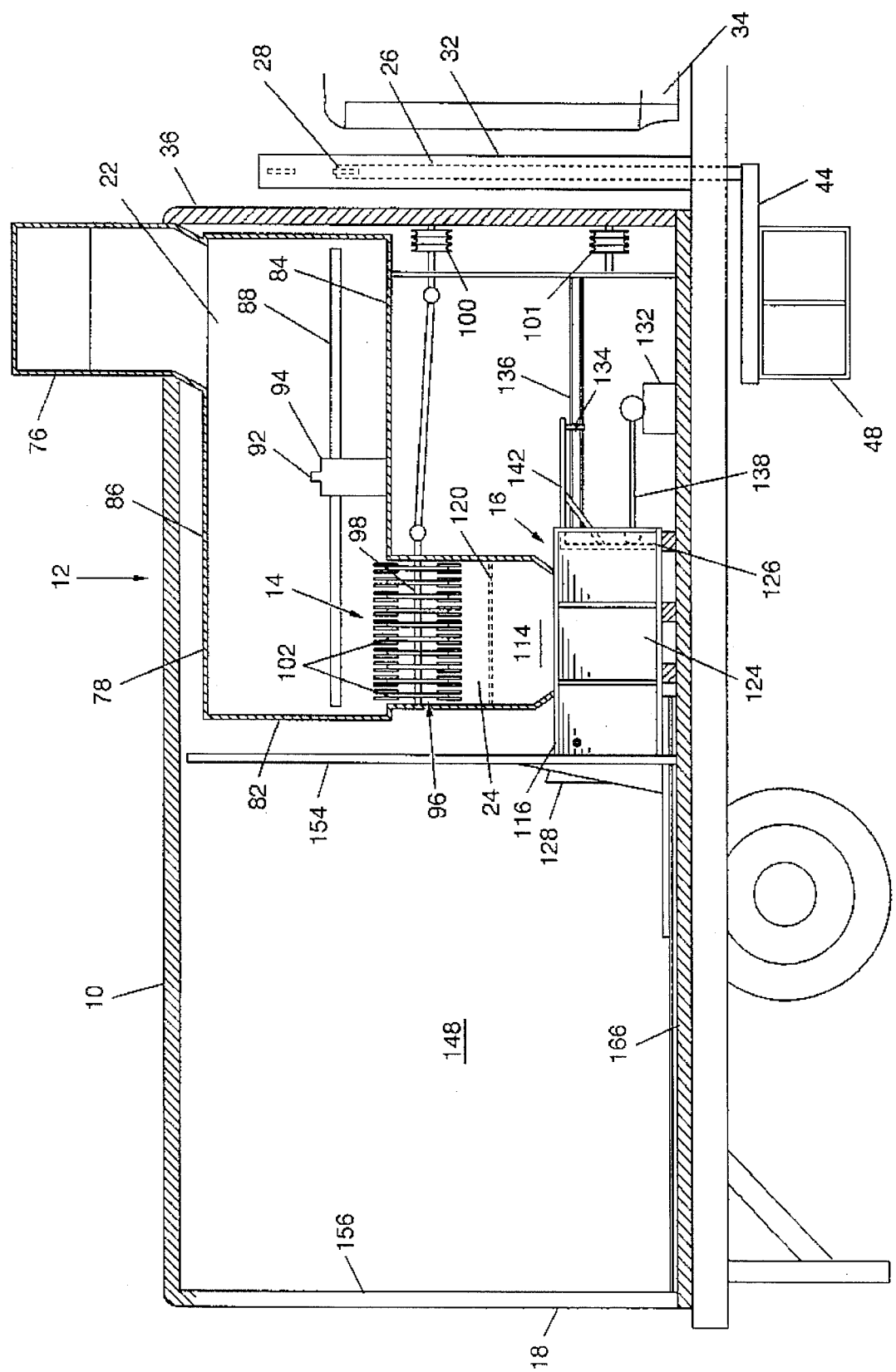
FIG. 1 is a side elevation showing in schematic form a mobile paper shredder according to the invention.

FIG. 1 shows a paper shredding apparatus mounted on a truck 10. The major elements of the paper shredding apparatus are a paper feeder 12, paper shredder 14 and shredded paper unloader 16. Shredded paper is discharged from the rear 18 of the truck 10. The paper feeder 12 includes an inlet 22 and outlet 24.

Figure 2A:
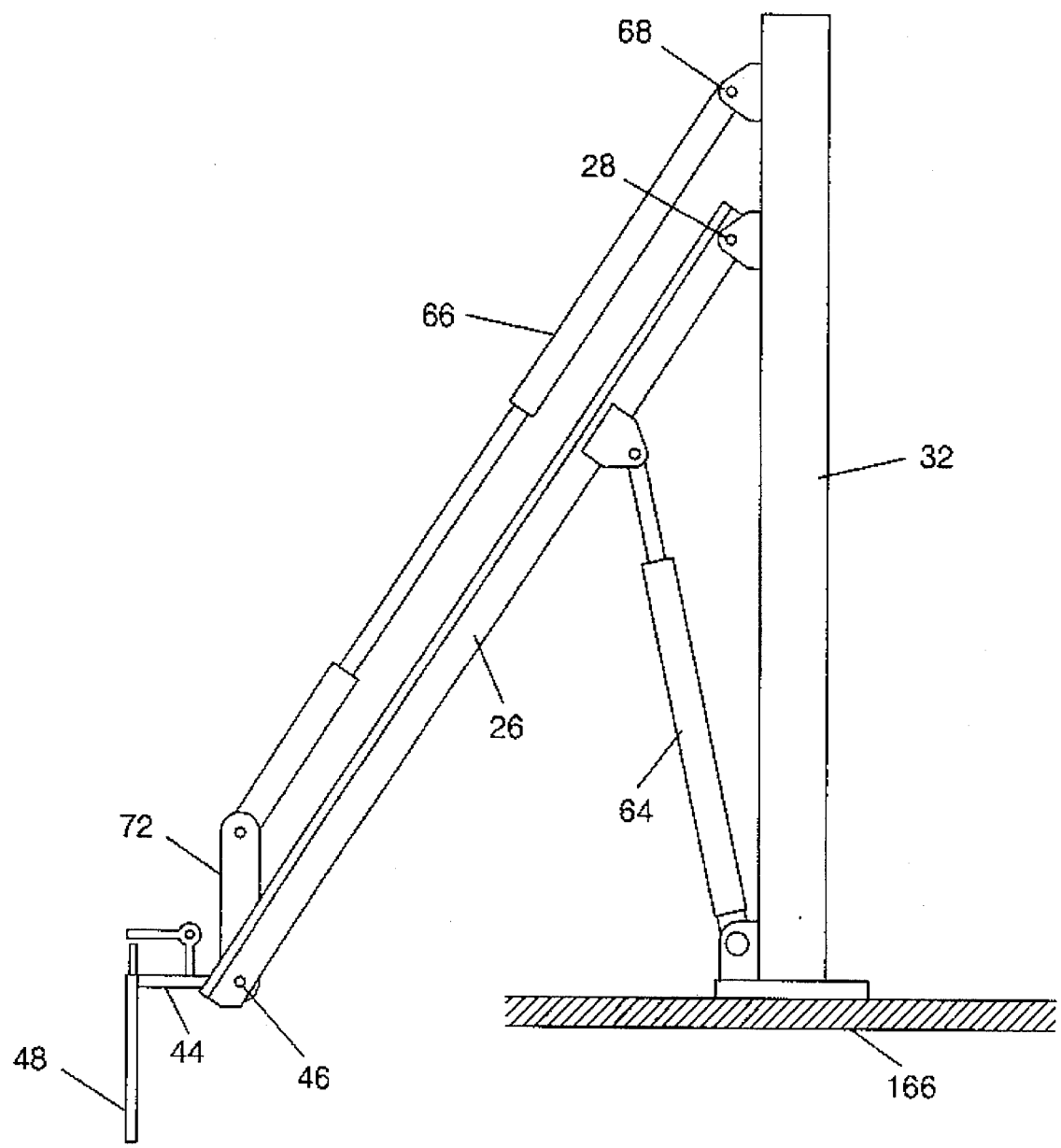
FIG. 2A is a side elevation of a lever arm for use in loading paper into the mobile paper shredder of FIG. 1.
Figure 2C:
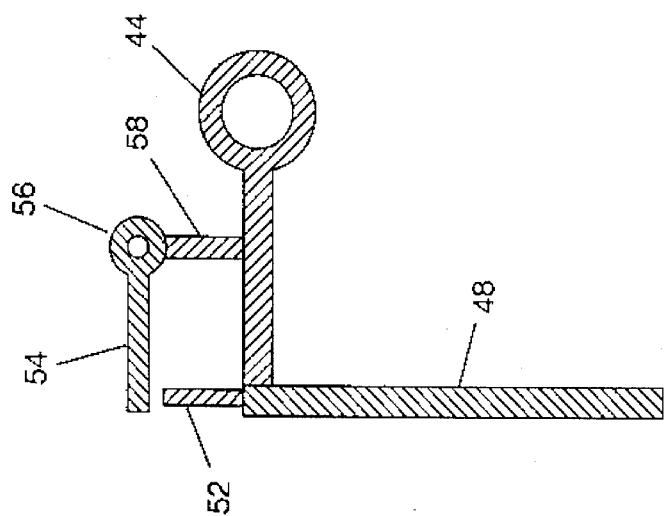
FIG. 2C is a detail in side section of the latch of FIG. 2B.
Figure 2B:
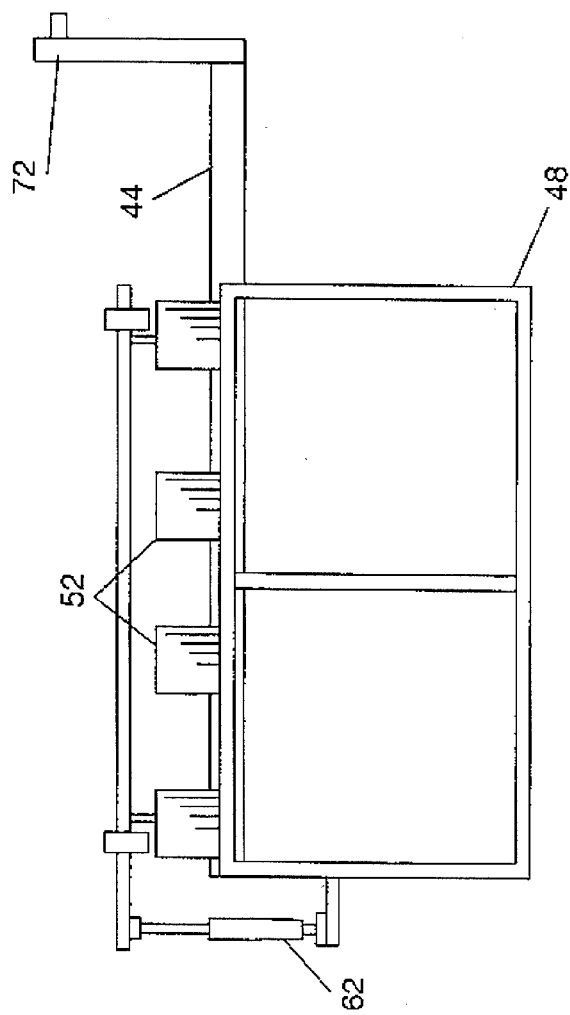
FIG. 2B is a front view of a latch for securing a paper container onto the lever arm of FIG. 2A.
Figure 2D:
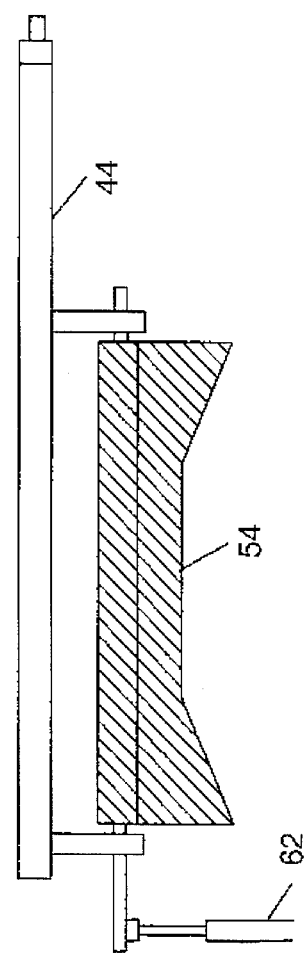
FIG. 2D is a detail, front view, of the latch of FIG. 2D.
Figure 2E:
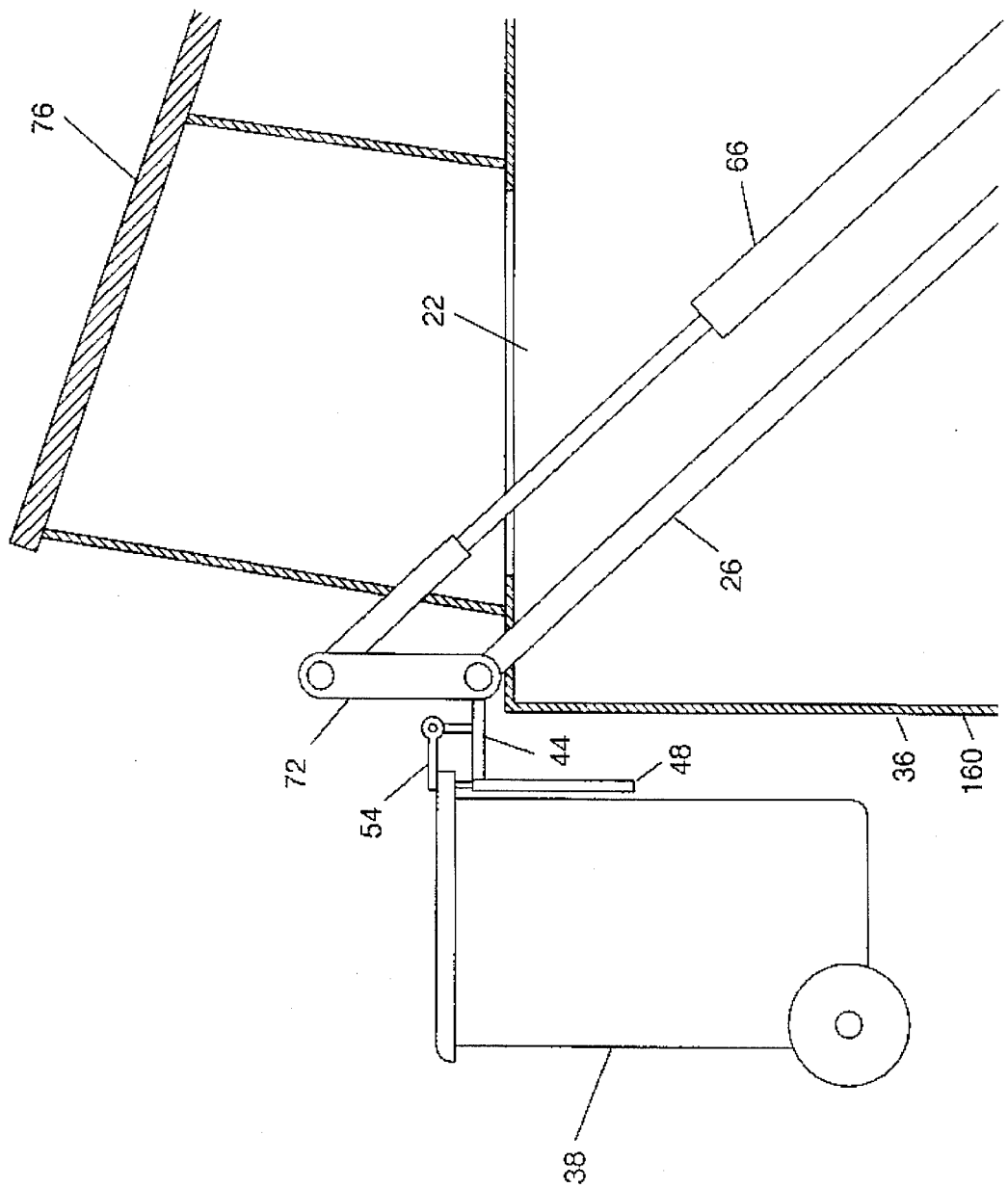
FIG. 2E shows the lever arm in an upper position ready for the discharge of paper into the paper shredder.
Figure 2F:
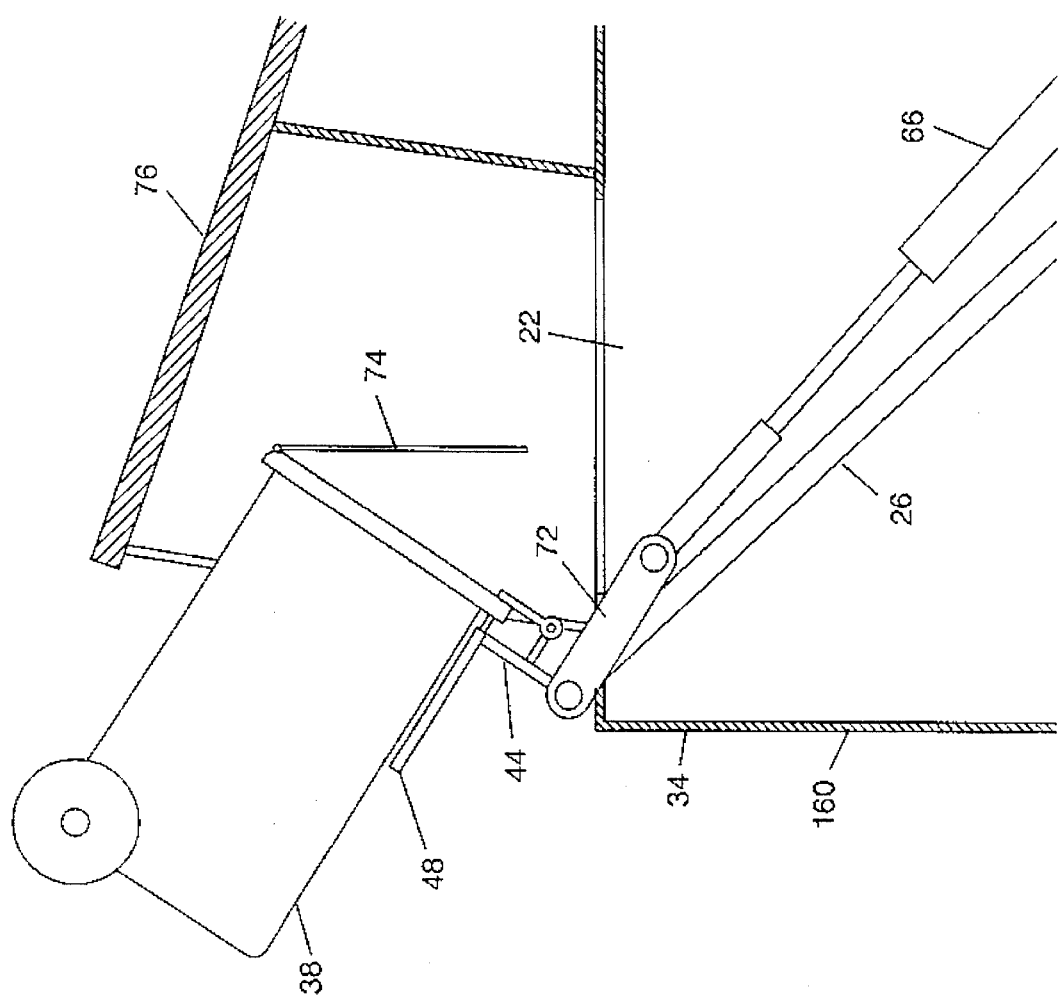
FIG. 2F shows the lever arm in an upper position showing the manner of discharge of paper into the paper shredder.

Paper to be shredded is supplied into the inlet 22 of the paper shredder through the lifting arm mechanism shown in FIG. 1 and more particularly in FIGS. 2A–2F. The lifting arm mechanism is formed from a lifting arm 26 mounted on a pivot 28 that creates a horizontal axis for rotation of the lifting arm. The pivot 28 is secured to a post 32 secured as by bolts to the truck 10. In the example shown, the truck 10 is a Mack™ truck and the post 32 is mounted between the cab 34 and cargo compartment 36. The lifting arm 26 is rotatable from a lower position (FIG. 1, 2A) for attaching a paper container (element 38 in FIG. 2E) onto the lifting arm 26 to an upper discharge position (FIGS. 2E, 2F). The paper container 38 is attached to free end 42 of the lifting arm 26, and latched onto the lifting arm 26 by the latch mechanism shown in FIGS. 2B, 2C and 2D. The latch includes a bar 44 that is pivotally secured to the free end of the lifting arm 26 by a pin 46. The bar 44 has a depending frame 48 and upwardly directed tabs 52 extending from the bar 44. A catch bar 54 is rotatably secured along a pivot line 56 at the end of supports 58 extending upwardly from bar 44. The catch bar 54 is manually rotatable by lever 62. To secure a paper container 38 on the latch mechanism, the catch 54 is rotated up and away from the tabs 5, the lip of the container is set over the tabs 52, and the catch 54 is replaced. The paper container 38 is prevented from swinging in towards the truck by depending frame 48. The paper container is thus easily detached from the latch by rotating the catch and lifting the lip of the paper container off the tabs 52. The lifting arm 26 is rotated from the lower to upper position by hydraulic ram 64, which may be conveniently powered through the truck 10. In the lower position, the paper container 38 is initially upright.

The lifting arm 26 is used to lift the paper containers 38 into a position ready for emptying. Means is also provided to rotate the paper container into an emptying position as shown in FIGS. 2E and 2F. A second hydraulic ram 66 is coupled between a pivot 68 on post 32 and a connector bar 72 that is rotatably connected to the ram 66 and the free end of the lifting arm 66. The bar 44 and connector bar 72 are rigidly connected to each other. When the lifting arm 26 is in the upper position shown in FIG. 2E, operation of the ram 66 on the backwards stroke rotates the paper container 38 into a partially inverted emptying position shown in FIG. 2F. The lid 74 of the paper container 38 moves away under gravity from the top of paper container 38 and paper is disgorged into inlet 22 of the feeder 12 under cover 76.

Figure 3:
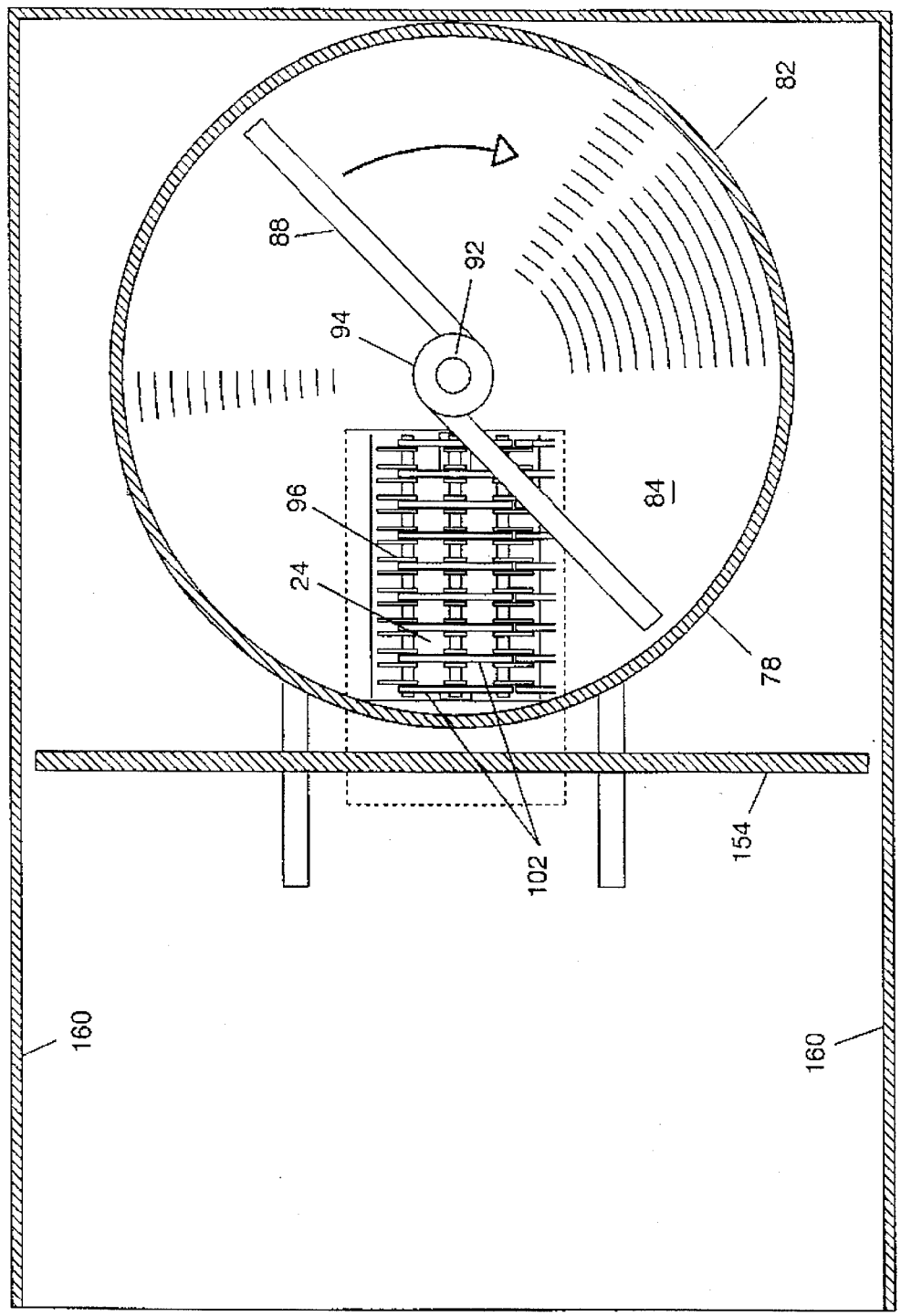
FIG. 3 is a top view of a feeding tub with sweeping arm for use with the mobile paper shredder of FIG. 1.

Referring in particular to FIG. 3, the inlet 22 of the paper feeder 12 is located at one side of a tub 78 formed of an encircling wall 82, and a lower confining surface 84 and upper confining surface 86. The inlet 22 is formed in the upper confining surface 86. The outlet 24 of the feeder 12 is formed in the lower confining surface 22 spaced from the inlet 22. Inside the tub 78 is mounted a sweeping arm 88 mounted for rotation about a vertical axis 92 in the tub 78 and to sweep around the tub above the lower confining surface 84 within the encircling wall 82. The sweeping arm 92 may also be powered by the truck 10, through its power take off and gear 94, and is preferably hydraulically powered. The sweeping arm 92 sweeps paper to be shredded around the tub 78 towards the outlet 24. Paper is thus fed into the outlet 24 in the direction along the lower confining surface 84.

Figure 4:
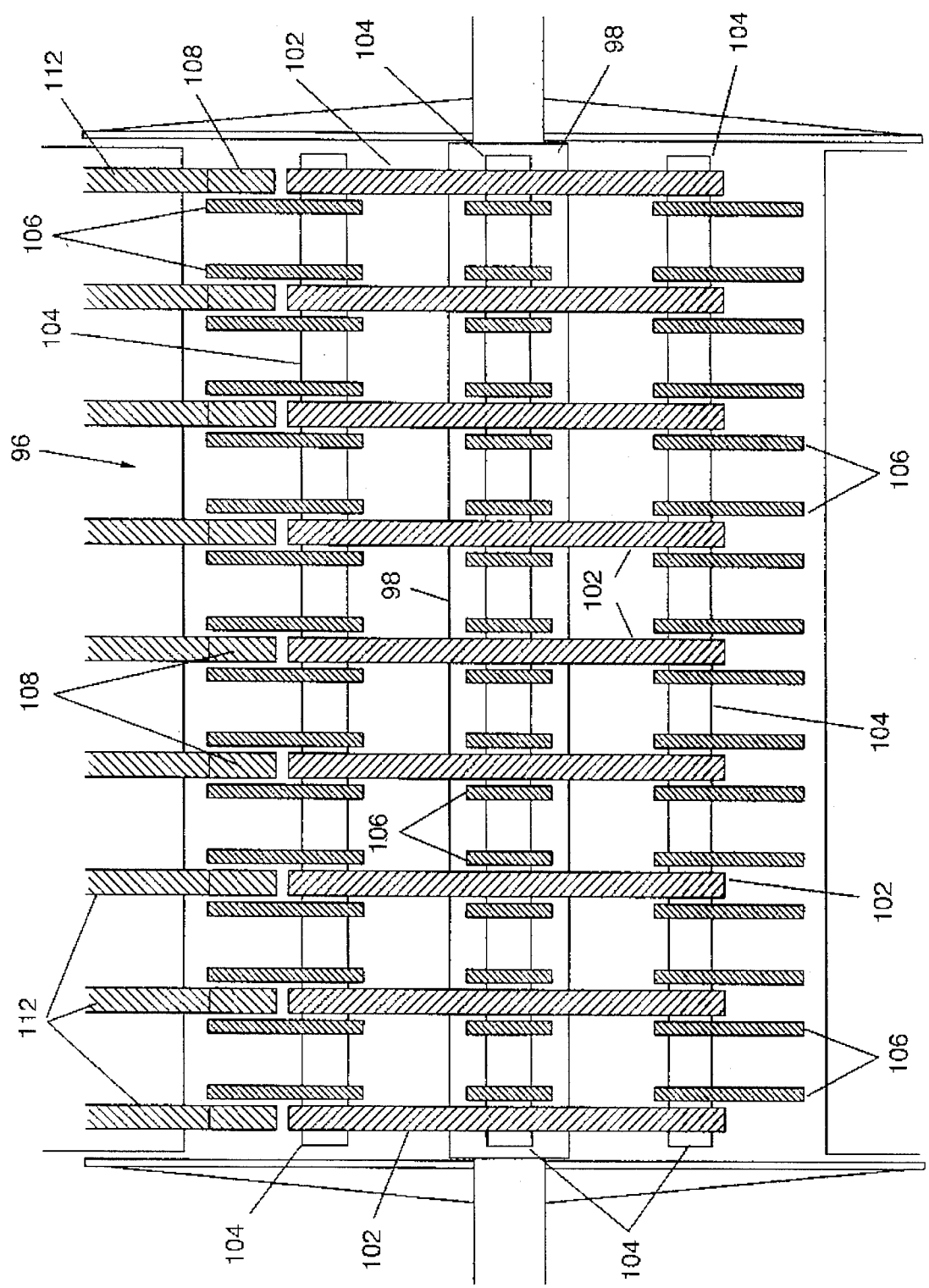
FIG. 4 is a top view of a paper shredder for use with the mobile paper shredder of FIG. 1, particularly showing the spacing of hammers.
Figure 4A:
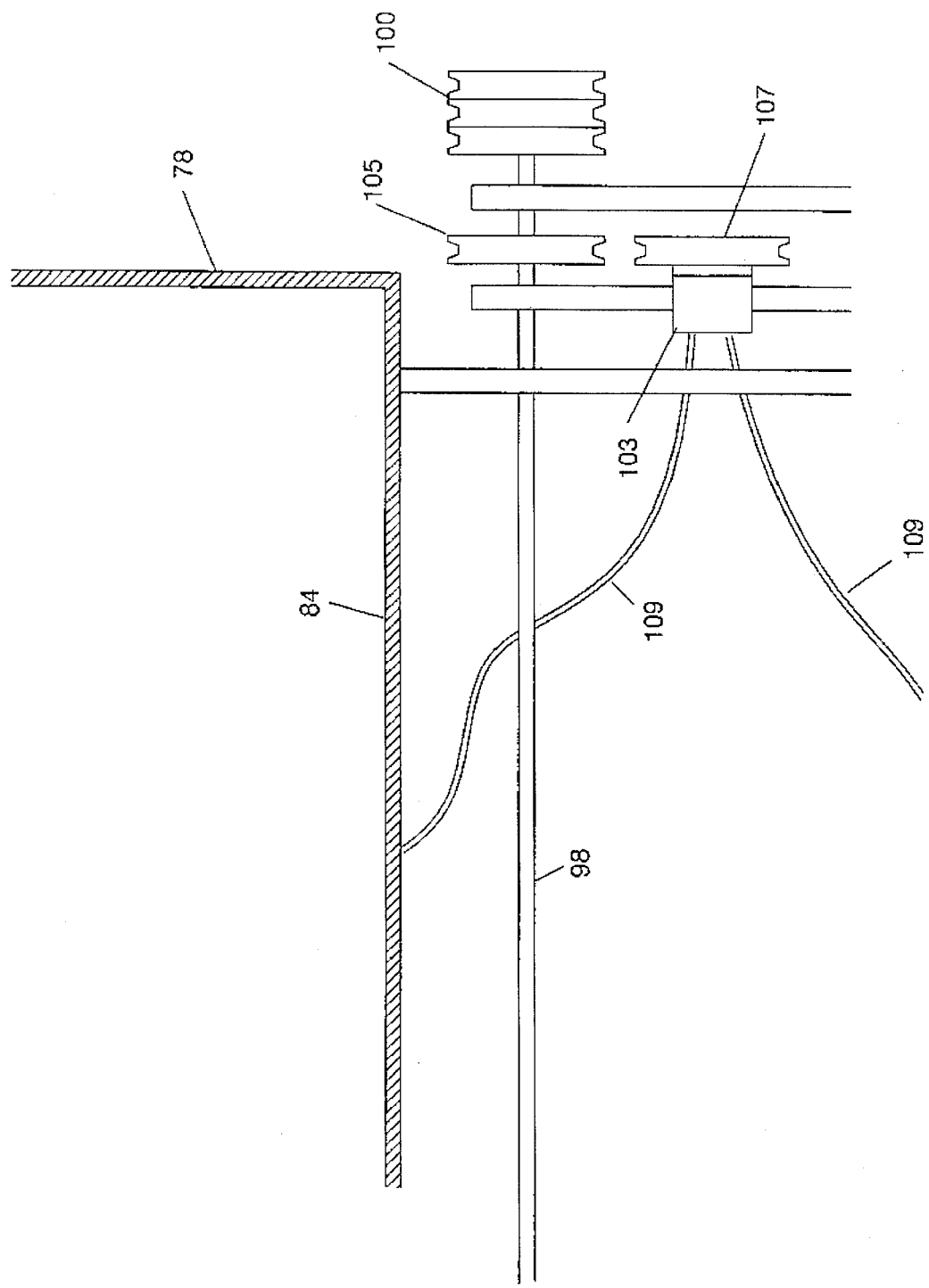
FIG. 4A is a detail showing a governor connected between the paper shredder shown in FIG. 4 and the feeding tub sweeping arm shown in FIG. 3.
Figure 5:
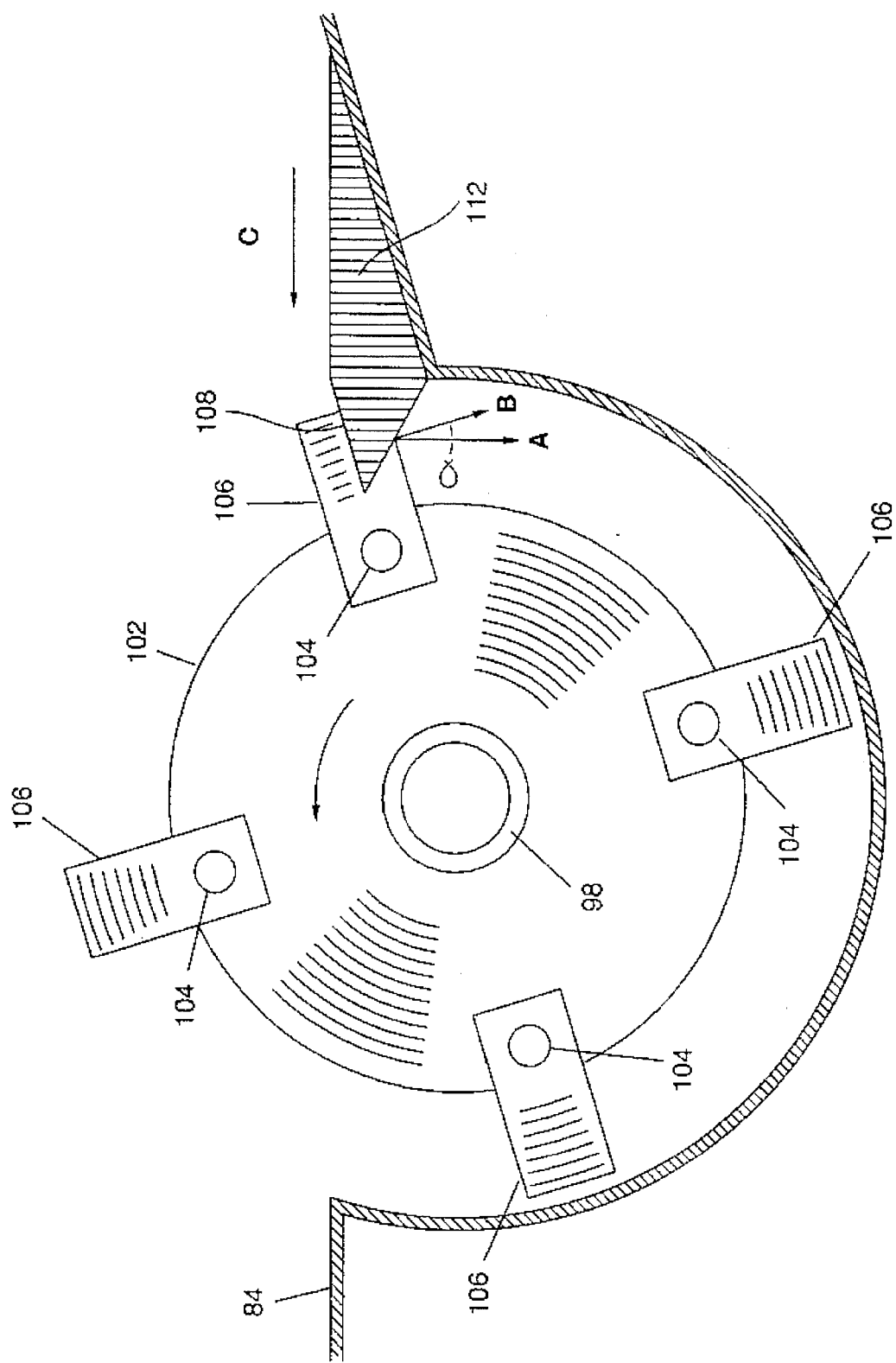
FIG. 5 is a side view of one set of hammers in the paper shredder shown in FIG. 4.
Figure 6A:
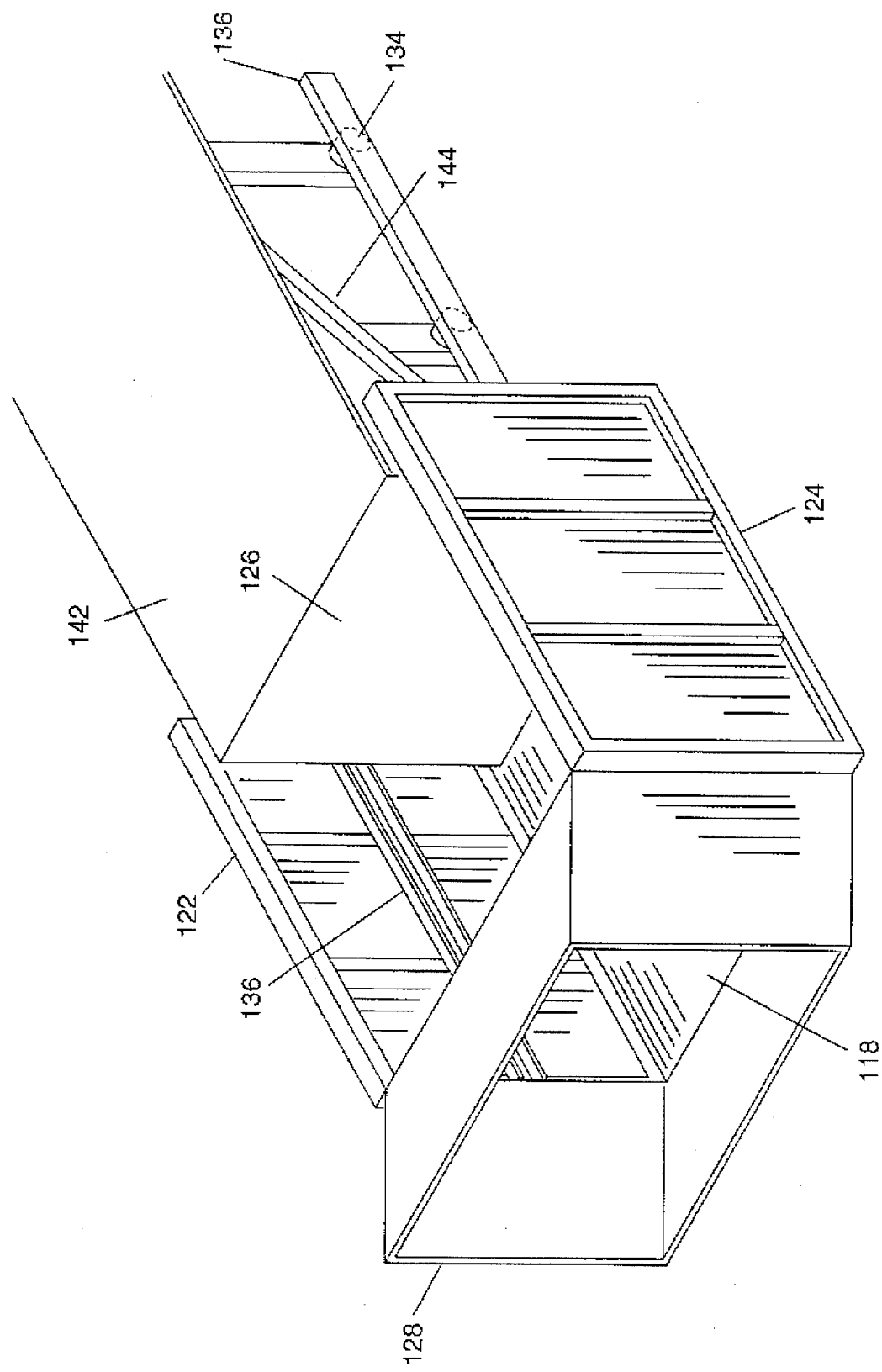
FIG. 6A is a perspective view of a compactor for use with the mobile paper shredder shown in FIG. 1.
Figures 8A, 8B:
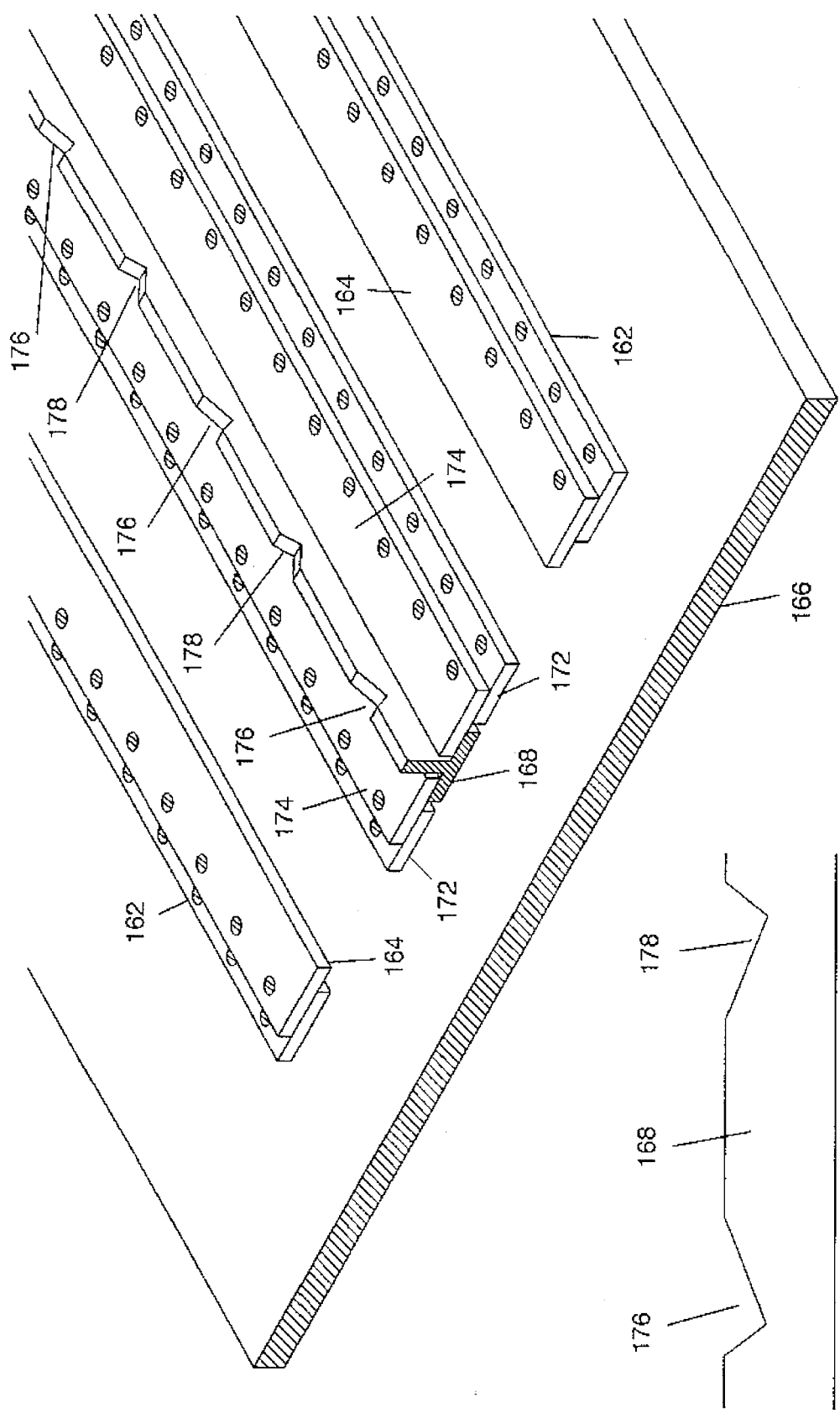
FIG. 8A shows a track and drive bar for moving the moving wall shown in FIG. 7A.
FIG. 8B shows a detail of the drive bar of FIG. 8A.

Referring in particular to FIGS. 4 and 5, the paper shredder 14 includes a rotating hammer mill 96 mounted on a shaft 98 just below the lower confining surface 84 of the tub 78. The hammer mill 96 includes plural parallel circular plates 102 mounted on the shaft 98. At 90° intervals around the periphery of the plates 102, pins 104 are connected between adjacent plates 102. A pair of hammers 106 are pivotally mounted on each pin 104. Each hammer 106 is free to pivot on its pin 104. Due to rotation of the hammer mill, the hammers 106 tend to be oriented essentially radially during operation. Impact surfaces 108 on bars 112 are provided along one side of the outlet 24. The lower confining surface 84 of the tub 78 slopes gently down at an angle of about 15°–17° towards the opening in the tub in which the hammer mill sits thus forming a beach. The impact surfaces 108 protrude up from the beach. Paper to be shredded is fed across the lower confining surface 84, and ramps up across the impact surfaces 108 to the impact position where the hammers 106 first pass the impact surfaces 108. The direction of movement of the hammers 106 at the point of impact, hence also the direction of the force exerted by the hammers at impact is shown by the arrow B. The direction that the shredded paper is desired to move is shown by the arrow A. The angle between A and B is the striking angle. Angle α should be less than 30°, and as close to zero as possible. The direction of feed of the paper to be shredded is shown by arrow C. The angle between the direction of feed and the radial direction of the hammer is α.

The hammer mill is rotated on shaft 98 by a motor (not shown), which may for example be the truck motor, with appropriate linkages, for example pulleys 100 and 101 (the belts on the pulleys 100, 101 are not shown), between the truck power take off and the shaft 98. Power for the moving parts is conveniently taken off the truck power take off, but other ways of supplying power may be used as would be clear to a person skilled in the art. The sweeping arm 88 must be mounted high enough to clear the hammers 106. The sweeping arm rotates slowly below about ½ rpm.

It is preferred that the hammer mill rotate at about 2000 rpm. If the rotation of the hammer mill drops below a certain rate, for example 1800 rpm, it is likely this is due to jamming of paper against the hammer mill, and it is preferred that the sweeping arm 88 rotation be dropped substantially (perhaps to zero rpm) in order to allow the jam to clear. Therefore, it is desirable that a governor 103 be supplied that is attached to the shaft 98, as for example by pulley 105 on the shaft 98 and pulley 107 on the governor 103 connected by a belt (not shown). The governor 103 contains a switch to close and open a hydraulic line 109 powering the gear 94 to turn the sweeping arm 88 off when the rpm of the hammer mill drops below a given amount, say 1800 rpm, and thus regulate the rate of feed of paper into the paper shredder. The actual trigger speed for the governor 103 depends on such factors as the kind of paper being shredded and the size, speed and sharpness of the paper shredder.

Shredded paper falls between the impact bars 112 into space 114 below the hammer mill, and then by gravity into bin 116 which forms part of the unloader 16. A mesh screen 120 is provided in the space 114 below the hammer mill. The size of mesh in the mesh screen 120 can be selected according to the size of paper particle it is desired to have exit the paper shredder. Referring to FIG. 1 and also in particular to FIGS. 6A–6D, the bin is formed by a base 118, first sidewall 122 and second sidewall 124 spaced from each other and separated by the base 118, a reciprocating end wall 126 disposed between the first sidewall 122 and second sidewall 124, and an upwardly extending discharge chute 128 opposed to the reciprocating end wall 126. A gear 132 connected to the truck power take off for example through a chain, sprocket and flywheel linkage (not shown) is operatively connected to the reciprocating end wall 126 such that reciprocation of the end wall 126 compacts shredded paper within the bin and forces it out of the discharge chute 128. The end wall 126 is mounted on wheels 134 that run in tracks 136 that extend along each of the sidewalls 122. Shaft 138 connects the reciprocating end wall 126 with motor 132. The end wall 126 is given structural rigidity by top plate 142 and strut 142 providing reinforcement between them.

The bin with reciprocating end wall forms a compactor for compacting shredded paper received from the shredder 14. The compactor forms part of the unloader 16. Compacted shredded paper is pushed by the compactor up and into a shredded paper storage area 148 formed in the rear of the truck 10 and bounded by wall 154, 156 and side walls 160 (one shown in FIG. 2E) of the cargo compartment 36 of truck 10. Referring now to FIGS. 7A and 7B there is shown a device for unloading paper from truck 10. The discharge chute 128 lies protruding through an opening 152 in wall 154 formed of panels 154A–154E during paper shredding, such that shredded paper discharges into the volume 148 between the wall 154 and wall 156 at end 18 of the truck. Wall 154 is mounted on angle irons 158, whose lower edges slide in slots 162 formed between an upper one of staggered plates 164 and the floor 166 of the storage area 148. The wall 154 is moved across the storage area 148 by a ratchet mechanism. Drive I-bar 168 slides in slots 172 formed between the floor 166 and the upper one of staggered plates 174. The I-bar 168 is notched with notches having a steep side and a shallow side. In alternating notches 176, 178, the steep side is reversed in direction from the previous notch. Pawl 182 is suspended on a pivot from a lower portion of wall 154. Enough room is left between the point of suspension of the pawl 182 and the wall 154 to allow the pawl 182 to be flipped over from one side or the other. The pawl 182 drops down into one or another of the notches 176, 178. Depending on which notch 176, 178 the pawl 182 falls into, the wall may be moved towards or away from the unloading wall 156. The unloading wall 156 is openable in conventional fashion and forms an unloading gate.

To avoid clogging the apparatus with particles of paper, a vacuum 182 is mounted on the floor 166 of the truck and powered by a motor 184 underneath the floor of the truck. The vacuum is preferably located adjacent the shredder out of the storage area 148.

The manner of operation of the mobile paper shredder will now be described. The method begins with the step of feeding paper into the mobile paper shredder, followed by shredding the paper to produce shredded paper. Paper is preferably fed to the paper shredder through tub 78. Paper feeding is preferably accomplished by loading paper into the tub 78 by lifting the paper in paper container 38 on a lifting arm 26 to a point above the tub, and rotating the paper container 38 to discharge the paper into the tub 26. After paper is shredded by action of the hammers passing between the impact surfaces, the next step is preferably compacting the shredded paper to produce compacted shredded paper; followed by periodically moving the compacted shredded paper towards and out of the unloading gate 156. The rotating arm 88 of the tub moves paper in the direction of feed within the tub 78 towards the opening in the lower confining surface 84 of the tub 78. The rotating hammers 106 of the hammer mill plunge down between the impact surfaces 108, shredding the paper and forcing it down and depositing it into the bin 116. Within the bin 116, the paper is compacted by the plunger 126 and forced out of the discharge chute 128 into the storage area 148 behind the wall 154. Once the storage area 148 is filled, the compacted shredded paper can be unloaded by moving the wall 154 towards the unloading gate 156 at the rear 18 of the truck.

A person skilled in the art could make immaterial modifications to the invention described and claimed in this patent without departing from the essence of the invention.

The embodiments of the invention in which an exclusive property or privilege is claimed are defined as follows:

1. A paper shredding apparatus, comprising:

a paper feeder having an inlet and an outlet;

a paper shredder connected to receive paper from the outlet of the paper feeder, the paper shredder including an opening bounded at least on one side by impact surfaces, and a shredded paper outlet;

an unloader mounted to receive shredded paper from the shredded paper outlet of the paper shredder, the unloader including (1) a bin formed of a base, first and second sidewalls spaced from each other and separated by the base, a reciprocating end wall disposed between the first and second sidewalls, and a discharge chute opposed to the reciprocating end wall; and (2) a motor operatively connected to the reciprocating end wall such that reciprocation of the end wall compacts shredded paper within the bin and forces it out of the discharge chute.

2. The paper shredding apparatus of claim 1 in which the unloader further includes:

a shredded paper storage area bounded by walls, one of the walls being openable, and one of the walls being movable across the storage area towards the openable wall, the discharge chute disposed to discharge paper into the storage area through one of the walls.

3. The paper shredding apparatus of claim 2 in which the discharge chute is upwardly extending.

4. The paper shredding apparatus of claim 2 in which the paper feeder includes a tub formed of an encircling wall, and a lower and upper confining surface, the inlet being formed in the upper confining surface and the outlet being formed in the lower confining surface, the paper feeder including a sweeping arm mounted for rotation in the tub and to sweep across the lower confining surface between the encircling wall; and further including:

a lifting arm mechanism for lifting and rotating initially upright paper containers to empty the paper containers into the tub of the paper feeder.

5. The paper shredding apparatus of claim 1 further including:

a lifting arm mechanism for lifting and rotating initially upright paper containers to empty the paper containers into the paper feeder.

6. The paper shredding apparatus of claim 1 in which the paper feeder includes a tub formed of an encircling wall, and a lower and upper confining surface, the inlet being formed in the upper confining surface and the outlet being formed in the lower confining surface, the paper feeder including a sweeping arm mounted for rotation in the tub and to sweep across the lower confining surface between the encircling wall.

7. The paper shredding apparatus of claim 1 further including:

a lifting arm mechanism for lifting and rotating initially upright paper containers to empty the paper containers into the paper feeder; and the paper shredding apparatus being mounted on a vehicle.

8. A paper shredding apparatus, comprising:

a paper feeder having an inlet and an outlet, the paper feeder including a tub formed of an encircling wall, and a lower and upper confining surface, the inlet being formed in the upper confining surface and the outlet being formed in the lower confining surface, the paper feeder including a sweeping arm mounted for rotation about a vertical axis in the tub and to sweep across the lower confining surface within the encircling wall;

a paper shredder connected to receive paper from the outlet of the paper feeder, the paper shredder including an opening bounded at least on one side by impact surfaces, and a shredded paper outlet; and an unloader mounted to receive shredded paper from the shredded paper outlet of the paper shredder.

9. The paper shredding apparatus of claim 8 further including:

a lifting arm mechanism for lifting and rotating initially upright paper containers to empty the paper containers into the paper feeder.

10. The paper shredding apparatus of claim 9 in which the lifting arm mechanism includes:

a lifting arm mounted about a horizontal axis and rotatable from a lower position for attaching a paper container onto the lifting arm to an upper discharge position, the lifting arm having a free end;

a detachable latch for a paper container on the free end of the lifting arm; and means to rotate the paper container into an emptying position.

11. A paper shredding apparatus, comprising:

a paper feeder having an inlet and an outlet;

a lifting arm mechanism for lifting and rotating initially upright paper containers to empty the paper containers into the paper feeder;

a paper shredder connected to receive paper from the outlet of the paper feeder, the paper shredder including an opening bounded at least on one side by impact surfaces, and a shredded paper outlet; and an unloader mounted to receive shredded paper from the shredded paper outlet of the paper shredder.

12. The paper shredding apparatus of claim 11 in which the lifting arm mechanism includes:

a lifting arm mounted about a horizontal axis and rotatable from a lower position for attaching a paper container onto the lifting arm to an upper discharge position, the lifting arm having a free end;

a detachable latch for a paper container on the free end of the lifting arm; and means to rotate the paper container into an emptying position.

13. The paper shredding apparatus of claim 11 in which the paper feeder, lifting arm mechanism, paper shredder and unloader are mounted on a vehicle.

14. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, and a shredded paper outlet;

an unloader mounted to receive shredded paper from the shredded paper outlet of the paper shredder;

the feeder having a lower confining surface forming a predominantly horizontal plane;

the horizontal axis on which the plural hammers are mounted lying below the horizontal plane; and the direction of feed being along the lower confining surface of the feeder towards the opening in the shredder.

15. The paper shredding apparatus of claim 14 in which the plural hammers are mounted with the striking angle of the plural hammers being less than 30° at impact.

16. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, the striking angle of the plural hammers being less than 30° at impact, and a shredded paper outlet;

an unloader mounted to receive shredded paper from the shredded paper outlet of the paper shredder, the unloader including a bin formed of a base, first and second sidewalls spaced from each other and separated by the base, a reciprocating end wall disposed between the first and second sidewalls, and an upwardly extending discharge chute opposed to the reciprocating end wall; and the unloader including a motor operatively connected to the reciprocating end wall such that reciprocation of the end wall compacts shredded paper within the bin and forces it out of the discharge chute.

17. The paper shredding apparatus of claim 16 in which the unloader further includes:

a shredded paper storage area bounded by walls, one of the walls being openable and forming an unloading gate, and one of the walls being movable across the storage area towards the openable wall, the discharge chute disposed to discharge paper into the storage area through one of the walls.

18. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, the striking angle of the plural hammers being less than 30° at impact, and a shredded paper outlet;

an unloader mounted to receive shredded paper from the shredded paper outlet of the paper shredder; and the paper feeder including a tub formed of an encircling wall, and a lower and upper confining surface, the inlet being formed in the upper confining surface and the outlet being formed in the lower confining surface, the paper feeder including a sweeping arm mounted for rotation in the tub and to sweep across the lower confining surface within the encircling wall.

19. The paper shredding apparatus of claim 18 further including a governor connected between the paper shredder and the paper feeder to regulate feeding of the rate at which paper is fed into the paper shredder.

20. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, the striking angle of the plural hammers being less than 30° at impact, and a shredded paper outlet;

an unloader mounted to receive shredded paper from the shredded paper outlet of the paper shredder; and a lifting arm mechanism for lifting and rotating initially upright paper containers to empty the paper containers into the paper feeder.

21. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, the striking angle of the plural hammers being less than 30° at impact, and a shredded paper outlet;

an unloader mounted to receive shredded paper from the shredded paper outlet of the paper shredder;

the paper feeder including a tub formed of an encircling wall, and a lower and upper confining surface, the lower confining surface forming a predominantly horizontal plane, the inlet being formed in the upper confining surface and the outlet being formed in the lower confining surface, the paper feeder including a sweeping arm mounted for rotation in the tub and to sweep across the lower confining surface within the encircling wall;

the horizontal axis on which the plural hammers are mounted lying below the horizontal plane of the lower confining surface;

the direction of feed being along the lower confining surface of the feeder towards the opening in the shredder;

the unloader including a bin formed of a base, first and second sidewalls spaced from each other and separated by the base, a reciprocating end wall disposed between the first and second sidewalls, and a discharge chute opposed to the reciprocating end wall, and a motor operatively connected to the reciprocating end wall such that reciprocation of the end wall compacts shredded paper within the bin and forces it out of the discharge chute;

the unloader further including a shredded paper storage area bounded by walls, one of the walls being openable, and one of the walls being movable across the storage area towards the openable wall, the discharge chute disposed to discharge paper into the storage area through one of the walls; and a lifting arm mechanism for lifting and rotating initially upright paper containers to empty the paper containers into the paper feeder.

22. A paper shredding apparatus, comprising:

a paper feeder having an inlet and an outlet and a direction of feed towards the outlet;

a paper shredder connected to receive paper from the outlet of the paper feeder, the paper shredder including an opening bounded at least on one side by impact surfaces, plural hammers mounted about a horizontal axis for rotation within the opening past the impact surfaces, and a shredded paper outlet;

an unloader mounted to receive shredded paper from the shredded paper outlet of the paper shredder; and a governor connected between the shredder and the paper feeder to regulate feeding of the rate at which paper is fed into the paper shredder.

23. The paper shredding apparatus of claim 22 in which the plural hammers are mounted with the striking angle of the plural hammers being less than 30° at impact.

* * * * *